United States Patent [19]

Isomura

[11] Patent Number: 5,765,798
[45] Date of Patent: Jun. 16, 1998

[54] POWER SEAT SLIDE DEVICE

[75] Inventor: Tohru Isomura, Kanagawa, Japan

[73] Assignee: Ikeda Bussan Co., Ltd., Ayase, Japan

[21] Appl. No.: 856,002

[22] Filed: May 14, 1997

[30] Foreign Application Priority Data

May 22, 1996 [JP] Japan ................................. 8-150202

[51] Int. Cl.$^6$ ................................................. B60N 2/06
[52] U.S. Cl. ..................... 248/430; 297/344.1; 297/330; 248/429
[58] Field of Search .................... 248/429, 430; 297/344.1, 330

[56] References Cited

U.S. PATENT DOCUMENTS 5,447,352 9/1995 Ito et al. ............................ 248/429 X

FOREIGN PATENT DOCUMENTS 6278510 10/1994 Japan ................................. 297/330

*Primary Examiner*—Peter M. Cuomo
*Assistant Examiner*—David E. Allred
*Attorney, Agent, or Firm*—Foley & Lardner

[57] ABSTRACT

In order to neatly locate an electric drive mechanism under a seat, a unique measure is applied to a power seat slide device. An upper rail has an upper vertical flange through which the seat is secured to the upper rail. The vertical upper flange has a part mounting portion which extends forward beyond a front end of the upper rail. A recess is formed in the part mounting portion, which faces downward. A speed reduction gear box is neatly received in the recess and secured to the part mounting portion through a locking pin. An electric motor has one end secured to the gear box and the other end projected in a direction perpendicular to a direction in which the upper rail runs. A screw shaft extends from the gear box and extends in and along the upper rail. A nut member is secured to the lower rail and operatively engaged with the screw shaft.

7 Claims, 3 Drawing Sheets

5,765,798

1

POWER SEAT SLIDE DEVICE

BACKGROUND OF THE INVENTION

1. Field of the Invention

The present invention relates in general to seat slide devices for a motor vehicle, and more particularly to seat slide devices of a power type which comprises lower rails secured to a floor of the vehicle, upper rails mounting thereon a seat and slidably disposed on the lower rails, and an electric drive mechanism for driving the upper rails and thus the seat to a desired position relative to the lower rails with an electric power.

2. Description of the Prior Art

In automotive seats, there is a type which can be moved forward and/or rearward to a desired position with an electric power. For this movement, a power seat slide device is usually employed, which generally comprises lower rails secured to a floor of the vehicle, upper rails mounting thereon a seat and slidably disposed on the lower rails, and an electric drive mechanism for moving the upper rails relative to the lower rails with an electric power.

In order to clarify the task of the present invention, one early technology in the power seat slide device will be described with reference to FIGS. 3 and 4 of the accompanying drawings.

In FIG. 3, there is shown an exploded left portion of the power seat slide device 1. The left portion includes a left-side rail unit and an electric drive mechanism incorporated therewith, as will become apparent as the description proceeds.

In the drawing, denoted by numeral 2 is a lower rail which includes an elongate base wall 2a, elongate side walls 2b raised from side ends of the base wall 2a, elongate upper walls 2c projected laterally inward from upper ends of the side walls 2b and downward lips 2d directed downward from inner ends of the upper walls 2c. The lower rail 2 is secured at front and rear ends to a floor of a motor vehicle through respective front and rear brackets 4a and 4b. Slidably engaged with the lower rail 2 is an upper rail 5 which includes an elongate upper wall 5a, elongate side walls 5b directed downward from side ends of the upper wall 5a, elongate lower walls 5c projected laterally outward from lower ends of the side walls 5b, upward lips 5d raised from outer ends of the lower walls 5b and an upper vertical flange 5e raised from the upper wall 5a. The upper vertical flange 5e is secured to a lower portion of a seat (not shown).

As is seen from FIG. 4, upon assembly of the upper and lower rails 5 and 2, the lower walls 5c of the upper rail 5 are received in the lower rail 2 in a manner to face upward to the upper walls 2c of the lower rail 2. For smoothing the movement of the upper rail 5 relative to the lower rail 2, rollers 9a are put between the base wall 2a of the lower rail 2 and the lower walls 5c of the upper rail 5, and a plurality of balls 9b are put between each lower wall 5c of the upper rail 5 and the corresponding upper wall 2c of the lower rail 2. Due to presence of the lips 2d and 5d, the balls 9b are held in position.

With the above-mentioned parts, a left-side rail unit (2, 5, 4a, 4b, 9a and 9b) is provided.

Although not shown in the drawing, another (or right-side) rail unit having substantially the same construction as the above-mentioned left-side rail unit is arranged beside the left-side rail unit.

As is seen from FIG. 3, at a front end of the seat slide device, there is arranged an electric drive mechanism which

2 drives the upper rail 5 relative to the lower rail 2 with an electric power. The drive mechanism generally comprises an electric motor 11, a speed reduction gear box 12 secured to the motor 11, a screw shaft 13 extending from the speed reduction gear box 12 and a nut member 14 fixed to the lower rail 2. The speed reduction gear box 12 is connected to one end of the upper rail 5 through a bracket 21. A plurality of bolts 22 and 23 are used for this connection. The screw shaft 13 extends in and along the upper rail 5 and operatively engaged with the nut member 14.

Thus, when the electric motor 11 is energized, the screw shaft 13 is rotated at a certain lower speed to vary the distance between the speed reduction gear box 12 secured to the upper rail 5 and the nut member 14 secured to the lower rail 2. With this, the upper rail 5 is moved relative to the lower rail 2 moving the seat toward a desired position. When energization of the motor 11 stops, the seat stops.

However, due to inherent construction, the above-mentioned power seat slide device has the following drawbacks.

First, because the electric motor 11 and the speed reduction gear box 12, which are bulky in construction, are located at the front portion of the seat, the foot space for a seat occupant is considerably limited.

Second, due to the same reason, the external appearance of the seat assembly becomes poor. In fact, when the seat is moved to a back position, the motor 11 and the speed reduction gear box 12, which are unsightly, are easily viewed from a front space of the seat assembly. Although a cover member attached to the seat may solve this drawback, production cost of the seat assembly increases inevitably.

Third, due to the same reason, the work for bolting the front bracket 4a of the lower rail 2 to the vehicle floor is troublesome.

SUMMARY OF THE INVENTION

It is therefore an object of the present invention to provide a power seat slide device which is free of the above-mentioned drawbacks.

According to the present invention, there is provided a power seat slide device which comprises a lower rail adapted to be fixed to a fixed floor; an upper rail slidably engaged with the lower rail and adapted to mount thereon a seat, the upper rail having an upper vertical flange through which the upper rail is secured to the seat, the upper vertical flange having a part mounting portion which extends forward beyond a front end of the upper rail; smoothing means for smoothing movement of the upper rail relative to the lower rail; means for defining in the part mounting portion a recess which faces downward; a speed reduction gear box neatly received in the recess; securing means for securing the gear box to the part mounting portion; an electric motor having one end secured to the gear box and the other end projected in a direction perpendicular to a direction in which the upper rail runs; a screw shaft extending from the gear box and extending in and along the upper rail; and a nut member secured to the lower rail, the nut member being operatively engaged with the screw shaft.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
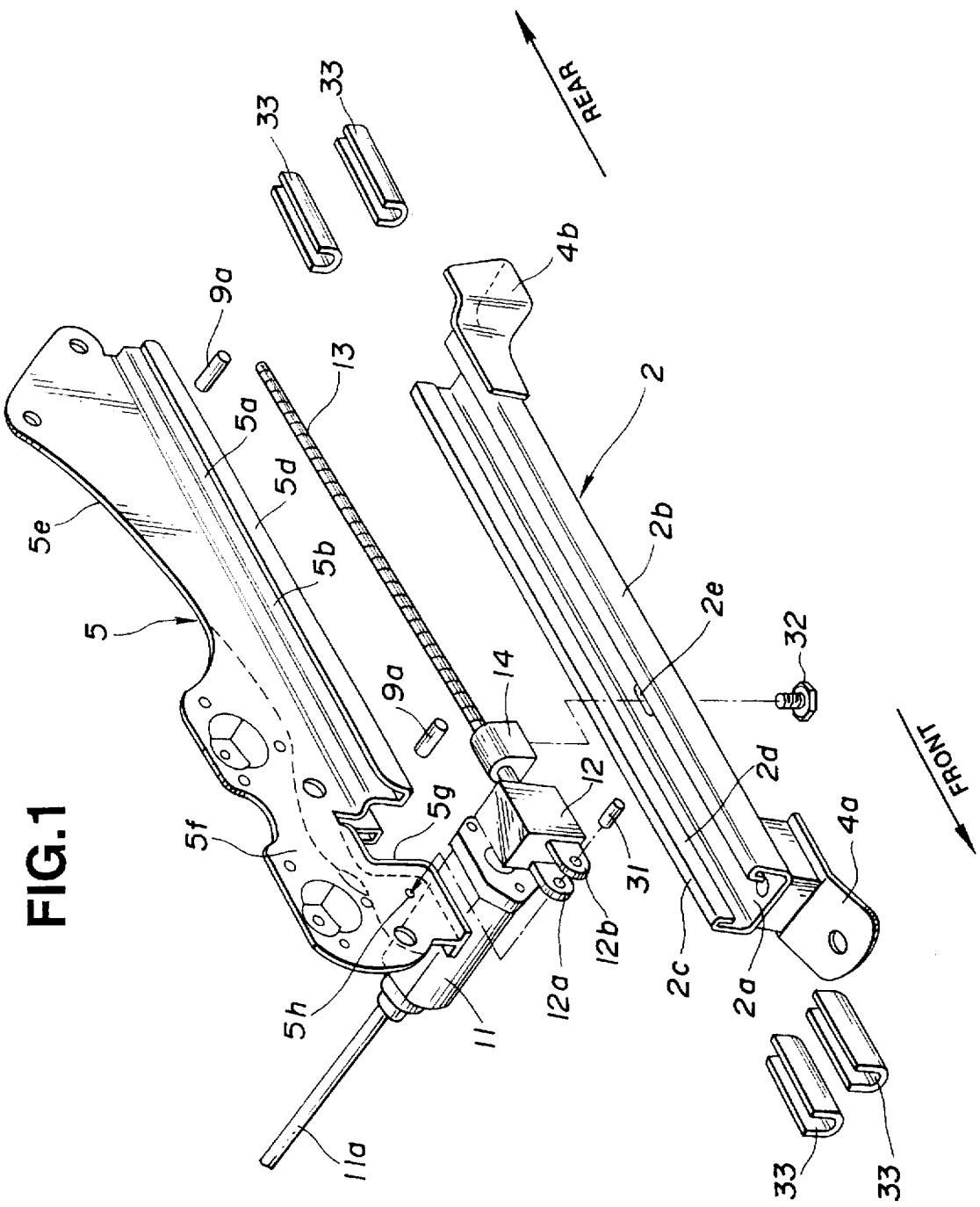
FIG. 1 is an exploded perspective view of an essential portion of a power seat slide device according to the present invention.

Referring to FIGS. 1, 2A, 2B and 2C, particularly FIG. 1, there is shown a power seat slide device according to the present invention. In these drawings, parts and portions substantially the same as those of the above-mentioned seat slide device of FIG. 3 are denoted by the same numerals.

In FIG. 1, denoted by numeral 2 is a lower rail which includes an elongate base wall 2a, elongate side walls 2b raised from side ends of the base wall 2a, elongate upper walls 2c projected laterally inward from upper ends of the side walls 2b and downward lips 2d directed downward from inner ends of the upper walls 2c. The lower rail 2 is secured at front and rear ends to a floor of a motor vehicle through respective front and rear brackets 4a and 4b.

Slidably engaged with the lower rail 2 is an upper rail 5 which includes an elongate upper wall 5a, elongate side walls 5b directed downward from side ends of the upper wall 5a, elongate lower walls 5c projected laterally outward from lower ends of the side walls 5b, upward lips 5d raised from outer ends of the lower walls 5b and an upper vertical flange 5e raised from the upper wall 5a.

The upper vertical flange 5e of the upper rail 5 is secured to a lower portion of a seat (not shown). More specifically, the upper vertical flange 5e is formed with a part mounting portion 5f to which various control devices, such as shift lifter and the like are connected. As shown, the part mounting portion 5f extends forward beyond a front end of the upper rail 5 and has a rimmed lower edge.

Figure 2A:
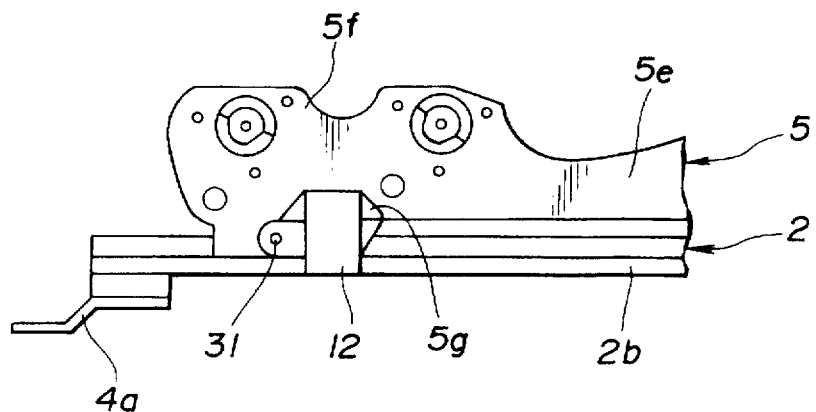
FIG. 2A is a front view of a front portion of the power seat slide device in an assembled condition.
Figure 2B:
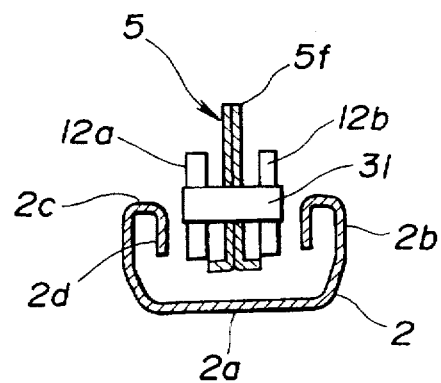
FIG. 2B is an enlarged sectional view of the front portion of the power seat slide device where a locking pin for securing a speed reduction gear box to an upper rail is arranged.
Figure 2C:
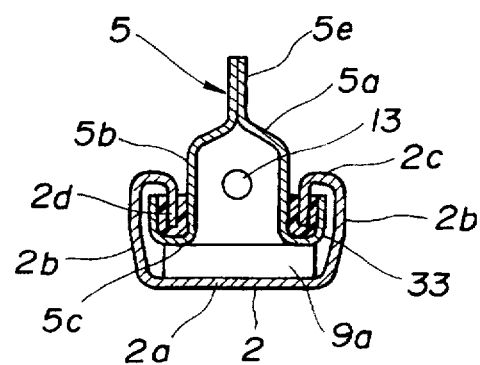
FIG. 2C is an enlarged sectional view of a rail unit employed in the power seat slide device.
Figure 3:
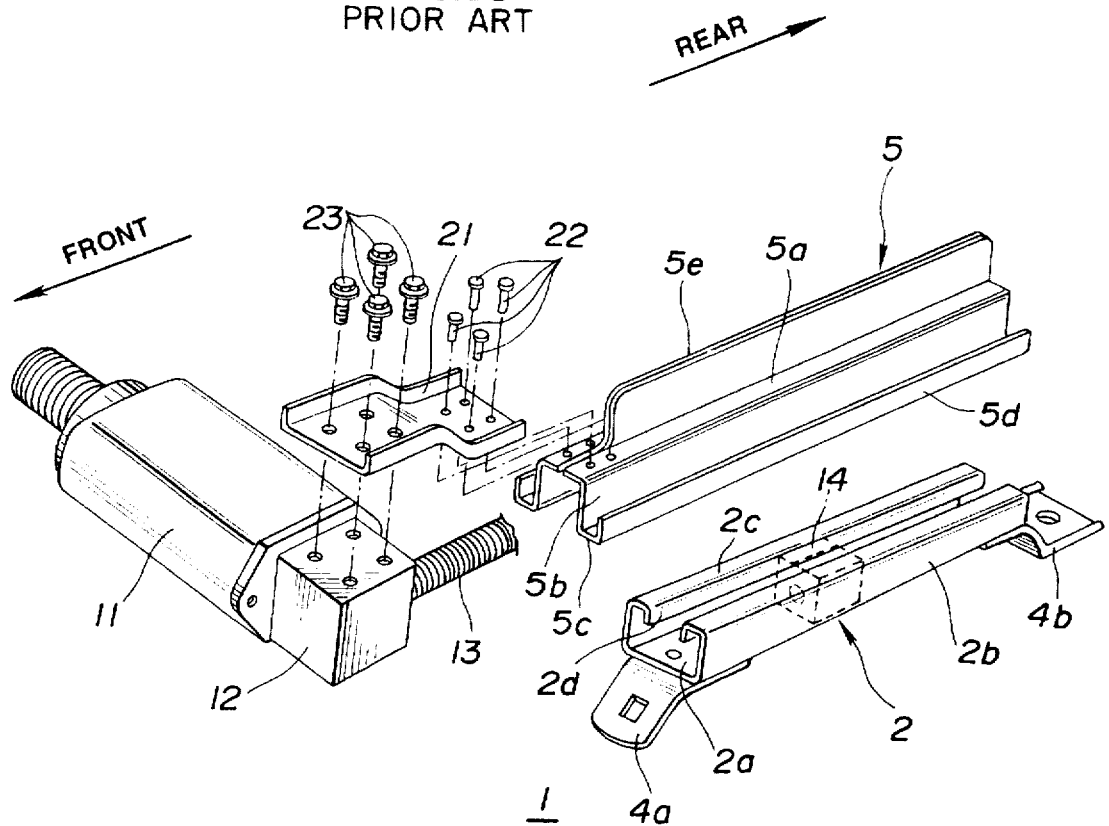
FIG. 3 is a view similar to FIG. 1, but showing early technology applied to a power seat slide device.
Figure 4:
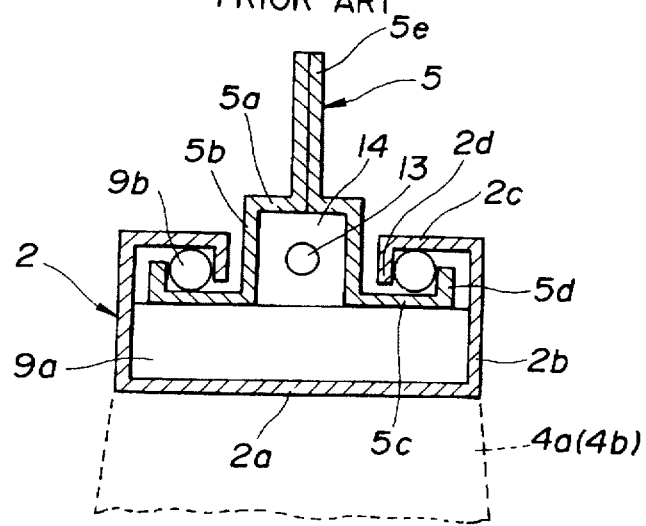
FIG. 4 is an enlarged sectional view of the power seat slide device of FIG. 3.

As is seen from FIG. 2C, upon assembly of the upper and lower rails 5 and 2, the lower walls 5c of the upper rail 5 are received in the lower rail 2 in a manner to face upward to the upper walls 2c of the lower rail 2. For smoothing the movement of the upper rail 5 relative to the lower rail 2, rollers 9a are put between the base wall 2a of the lower rail 2 and the lower walls 5c of the upper rail 5.

As is understood from FIGS. 2C and 1, four plastic sliders 33 are put between each lower wall 5c of the upper rail 5 and the corresponding downward lip 2d of the lower rail 2. More specifically, each slider 33 has a generally U-shaped cross section and is fitted to the downward lip 2d having the lip 2d tightly pressed thereinto. Preferably, the plastic sliders 33 may be bonded to the lower rail.

With the above-mentioned parts, a left-side rail unit (2, 5, 4a, 4b, 9a and 33) is provided.

Although not shown in the drawing, another (or right-side) rail unit having substantially the same construction as the above-mentioned left-side rail unit is arranged beside the left-side rail unit.

Referring back to FIG. 1, at an inboard side of the left-side rail unit, there is arranged an electric drive mechanism which drives the upper rail 5 relative to the lower rail 2 with an electric power. The drive mechanism comprises an electric motor 11, a speed reduction gear box 12 secured to the motor 11, a screw shaft 13 extending from the speed reduction gear box 12 and a nut member 14 fixed to the lower rail 2.

For mounting the electric drive mechanism to the left-side rail unit, the following measures are employed in the invention.

That is, as seen from FIG. 1, the upper vertical flange 5e of the upper rail 5 is formed at a lower part of the part mounting portion 5f with a rectangular recess 5g for nearly receiving the rectangular speed reduction gear box 12. The lower part of the part mounting portion 5f has in front of the recess 5g an opening 5h through which an after-mentioned locking pin 31 passes.

The gear box 12 is integrally formed at a front wall thereof with two mounting lugs 12a and 12b each having an opening for passing therethrough the locking pin 31. That is, as is seen from FIG. 2B, for securing the bear box 12 to the part mounting portion 5f of the upper rail 5, the locking pin 31 passes through the mounting lug 12a, the opening 5h of the part mounting portion 5f and the other mounting lug 12b.

It is to be noted that an axis passing through the openings (no numerals) of the two mounting lugs 12a and 12b intersects an axis of the screw shaft 13 at right angles.

The electric motor 11 secured to the hear box 12 projects toward the right-side rail unit (not shown). The screw shaft 13 extends in and along the upper rail 5 and operatively engaged with the nut member 14 which is bolted to the base wall 2a of the lower rail 2 through a bolt 32. For adjusting the position of the nut member 14 relative to the lower rail 2, an opening 2e for the bolt 32 is elongated.

As is understood from FIG. 1, the electric motor 11 has another output shaft 12a which extends toward the right-side rail unit (not shown). The right-side rail unit has parts which correspond to the speed reduction gear box 12, the screw shaft 13 and the nut member 14.

When, in operation, the electric motor 11 is energized, the screw shaft 13 is rotated to vary the distance between the speed reduction gear box 12 secured to the upper rail 5 and the nut member 14 secured to the lower rail 2. Thus, the upper rail 5 is moved relative to the lower rail 2 thereby moving the seat to a desired position.

In the following, advantages of the present invention will be described.

First, since the electric motor 12 and the speed reduction gear box 12, which are bulky, are placed under the seat, a larger foot space can be provided for a seat occupant. Furthermore, the external appearance of the seat assembly is hardly affected.

Second, because the gear box 12 is secured to the upper rail 5 having the locking pin 31 arranged perpendicular to the axis of the screw shaft 13, any external load produced when the screw shaft 13 is rotated about the axis is effectively received by the upper rail 5. This means that the part mounting portion 5f of the upper rail 5 is suppressed from deformation.

Third, because the bulky parts are not located at the front portion of the seat, the work for bolting the front bracket 4a of the lower rail 2 to the vehicle floor is easily achieved.

The present invention is not limited to the power seat slide device described and represented hereinbefore and various modifications can be made thereto without passing beyond the scope of the invention.

What is claimed is:

1. A power seat slide device comprising:

a lower rail adapted to be fixed to a fixed floor;

a one-piece upper rail having a lower rail engaging portion slidably engage with said lower rail and adapted to mount thereon a seat, said lower rail engaging portion having a front end and a rear end, said upper rail having an upper vertical flange through which said upper rail is adapted to be secured to said seat, said upper vertical flange having a part mounting portion which extends forward beyond said front end of said lower rail engaging portion;

smoothing means for smoothing movement of said upper rail relative to said lower rail;

a recess in said part mounting portion defined by a cut-out in a lower edge of said upper vertical flange;

a speed reduction gear box neatly received in said recess;

securing means for securing said gear box to said part mounting portion;

an electric motor having one end secured to said gear box and the other end projected in a direction perpendicular to a direction in which said upper rail runs;

a screw shaft extending from said gear box and extending in and along said upper rail; and a nut member secured to said lower rail, said nut member being operatively engaged with said screw shaft.

2. A power seat slide device as claimed in claim 1, in which said securing means comprises:

a pair of mounting lugs integrally formed on said gear box, each lug having an opening formed therethrough;

means defining an opening in said part mounting portion of said upper vertical flange of said upper rail; and a locking pin passing through the opening of one of the mounting lugs, the opening of said part mounting portion and the opening of the other mounting lug.

3. A power seat slide device as claimed in claim 2, in which the connection of said gear box to said part mounting portion is so made that an axis of the locking pin in the openings intersects an axis of the screw shaft at right angles.

4. A power seat slide device as claimed in claim 3, in which said part mounting portion of said upper rail has a rimmed lower edge.

5. A power seat slide device as claimed in claim 1, in which said smoothing means comprises:

rollers movably interposed between said lower and upper rails; and plastic sliders interposed between said lower and upper rails, each slider being secured to said lower rail.

6. A power seat slide device as claimed in claim 1, in which said lower and upper rails are of complementary cross sections.

7. A power seat slide device as claimed in claim 1, in which said recess and said speed reduction gear box are rectangular in shape.

* * * * *